(12) United States Patent
Mueller

(10) Patent No.: US 6,170,842 B1
(45) Date of Patent: Jan. 9, 2001

(54) STEP SYSTEM ON VEHICLE BUMPER FOR ACCESSING TRUCK BEDS AND METHODS OF MAKING AND OPERATING THE STEP SYSTEM

(75) Inventor: Gerald E. Mueller, Frankenmuth, MI (US)

(73) Assignee: Bad River, Inc., Saginaw, MI (US)

( * ) Notice: Under 35 U.S.C. 154(b), the term of this patent shall be extended for 0 days.

(21) Appl. No.: 09/219,674

(22) Filed: Dec. 23, 1998

(51) Int. Cl.⁷ .................................................. B60R 3/02
(52) U.S. Cl. ............................................ 280/163; 280/166
(58) Field of Search ................................... 280/163, 166, 280/164, 169; 293/155, 128, 122; 296/29

(56) References Cited

U.S. PATENT DOCUMENTS

| 1,479,644 | * | 1/1924 | Browne ................................. 280/169 |
| 1,630,293 | | 5/1927 | Fish . |
| 2,158,949 | * | 5/1939 | Sarles et al. ........................ 280/163 |
| 2,678,832 | | 5/1954 | Wright . |
| 2,721,345 | | 10/1955 | Aken . |
| 3,501,190 | | 3/1970 | McCrea . |
| 3,517,942 | | 6/1970 | Cuffe et al. . |
| 3,580,613 | | 5/1971 | Northrop . |
| 3,608,957 | | 9/1971 | Maneck . |
| 3,623,764 | | 11/1971 | Jacobus . |
| 3,627,350 | | 12/1971 | Cross . |
| 3,751,068 | | 8/1973 | Green . |
| 3,794,345 | * | 2/1974 | Locke ................................. 280/163 |
| 3,799,288 | | 3/1974 | Manuel . |
| 4,145,066 | | 3/1979 | Shearin . |
| 4,180,143 | | 12/1979 | Clugston . |
| 4,198,070 | | 4/1980 | Weiler . |
| 4,275,664 | | 6/1981 | Reddy . |
| 4,405,141 | | 9/1983 | Jurek . |
| 4,605,098 | * | 8/1986 | Leuty ....................................... 182/92 |
| 4,750,753 | * | 6/1988 | Dezern ............................. 280/164.1 |
| 4,753,447 | | 6/1988 | Hall . |
| 4,856,810 | * | 8/1989 | Smith .................................. 280/639 |
| 4,911,264 | * | 3/1990 | McCafferty .......................... 182/92 |
| 4,930,797 | | 6/1990 | Parrill . |
| 5,007,654 | * | 4/1991 | Sauber ................................ 280/166 |

FOREIGN PATENT DOCUMENTS

388909 * 1/1922 (FR) .................................... 280/163

* cited by examiner

Primary Examiner—Brian L. Johnson
Assistant Examiner—Bridget Avery
(74) Attorney, Agent, or Firm—Reising, Ethington, Barnes, Kisselle, Learman & McCulloch, P.C.

(57) ABSTRACT

A step assembly in combination with a vehicle having a frame and a rear bumper, with an upper surface and a generally vertical outer face, attached to the vehicle frame has an attachment leg with a generally perpendicularly extending step portion. A step bracket supported on the outer face of the bumper mounts the step for swinging movement from a first operative position in which one side of the attachment leg is disposed generally vertically adjacent the bumper face and the step portion extends generally perpendicularly to a retracted second position in which the opposite side of the attachment leg lies vertically adjacent the bumper and the step portion is inversely disposed and extends along the upper surface of the bumper. A lock device is automatically operative between the mount and step under the influence of gravity for releasably locking the step in both positions.

17 Claims, 4 Drawing Sheets

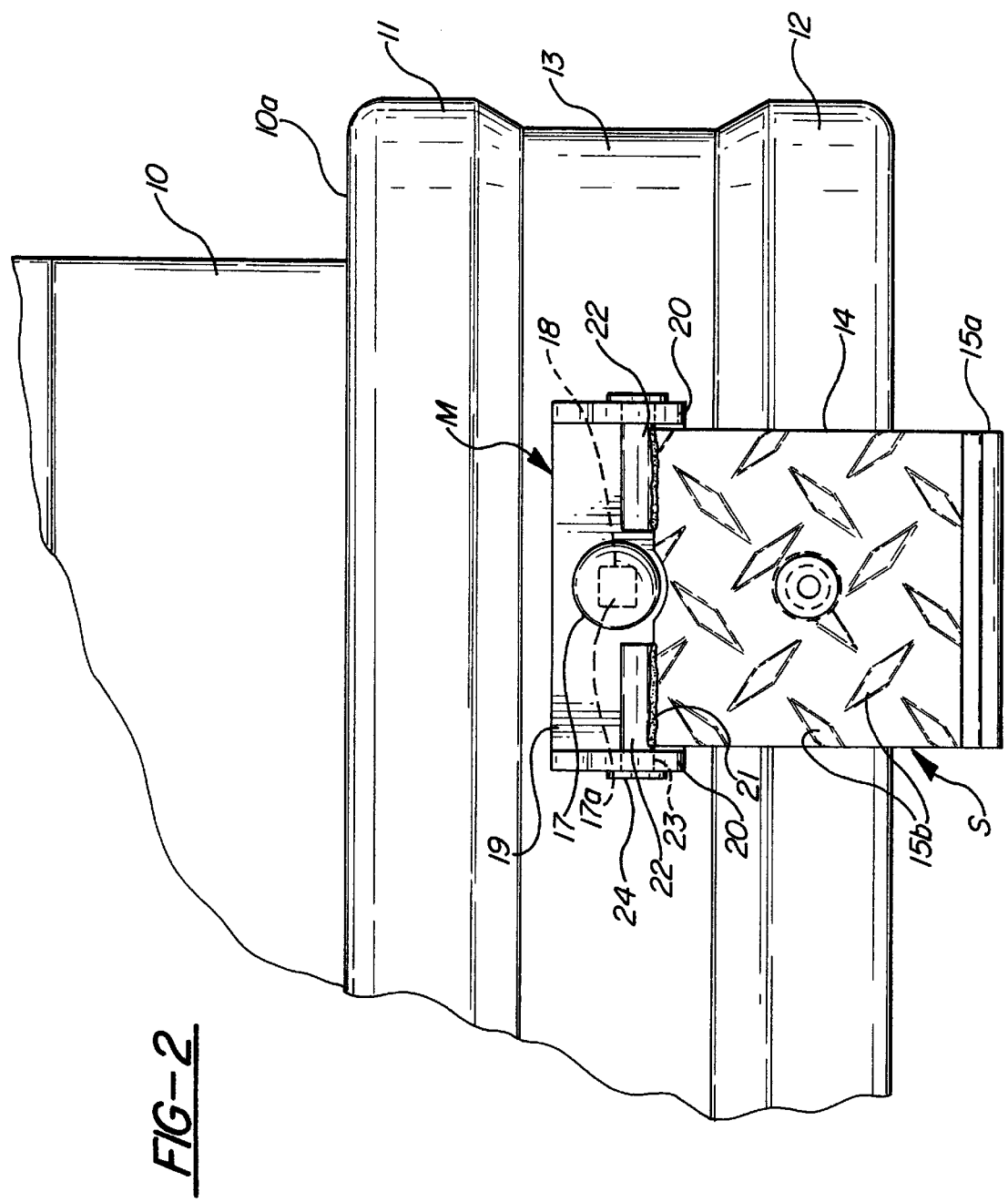

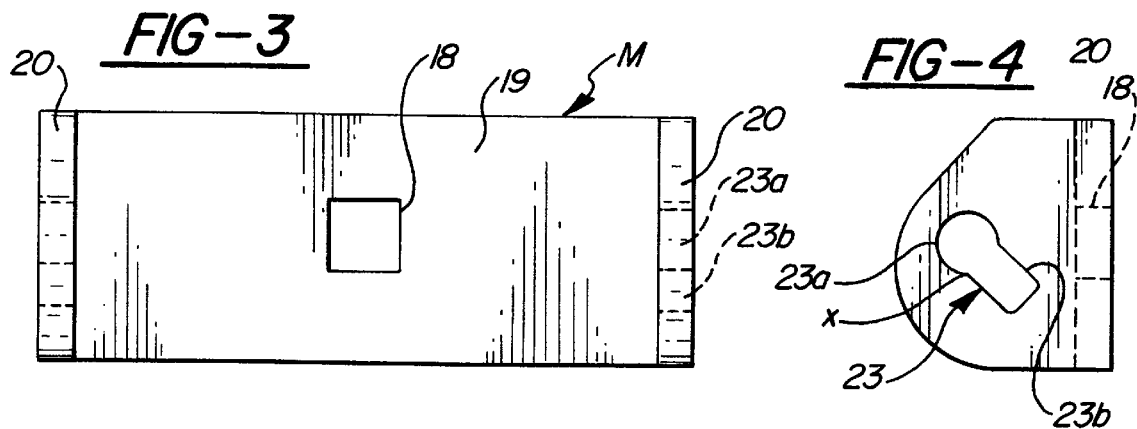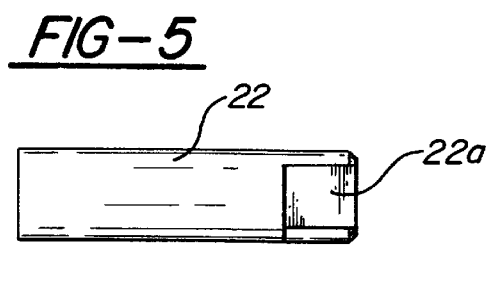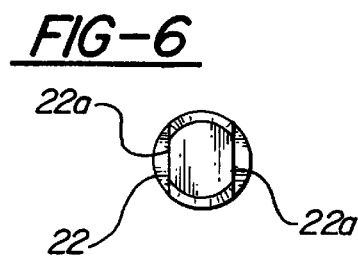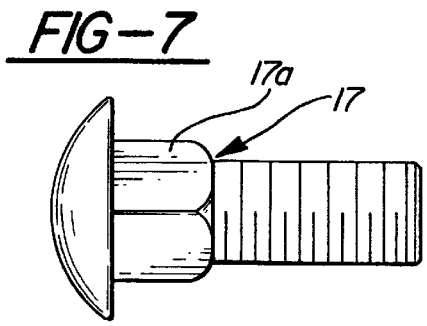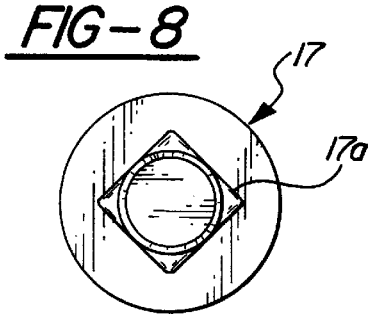

STEP SYSTEM ON VEHICLE BUMPER FOR ACCESSING TRUCK BEDS AND METHODS OF MAKING AND OPERATING THE STEP SYSTEM

This invention relates to steps of the type which can be used at the rear of a truck vehicle below the tailgate on the rear bumper for accessing the truck bed.

BACKGROUND OF THE INVENTION

The invention is concerned with certain new and useful improvements in steps of this character which have been previously proposed. In U.S. Pat. No. 3,627,350, granted to Denver F. Cross, Jul. 14, 1971, a bumper step is disclosed which in one position functions as a horizontally rearwardly extending tread plate and in a second position disposes the tread plate in inverted position above the generally horizontal upper surface of the bumper. This angular bumper step has not, to applicant's knowledge, enjoyed significant commercial favor and the present inventor believes that one reason for this is that, in both positions, the step will move and rattle when traversing rough roadways and rough terrain. In fact, not only will noisy and annoying rattling occur with this prior art construction, which I incorporate herein by reference, the bouncing and jouncing of the truck may well cause the step to swing down from its upper position.

SUMMARY OF THE PRESENT INVENTION

The bumper step of the present invention provides an integrated locking mechanism as a connection between the step mount and step attachment leg wherein pivoting of the step is permitted only when the leg is generally linearly raised from either of the operative and storage positions, but is prohibited unless the step is so raised. The construction is such as to automatically gravity lock the step in both its operative and storage positions.

One of the prime objects of the invention is to provide a bumper step assembly which is shiftable between a lower position of use and a rotated folded over storage position, and is automatically locked in both positions.

Another object of the invention is to provide a step attachment leg and mount mechanism which automatically locks the step in position, utilizing the forces of gravity, when the step is moved to either of its operative or storage positions.

Still another object of the invention is to provide a relatively simple step construction of this character in which the locking mechanism is provided as a function of the mount of the step and locking occurs automatically so that no manual engagement or disengagement of a separate locking mechanism is necessary.

A further object of the invention is to design a step which is held out away from the bumper in both use and storage positions by the same functioning element and cannot mar the bumper surfaces.

Another object of the invention is to provide a step which is very stable in its lowered position of use and is relatively economical to manufacture and assemble.

Still another object of the invention is to provide a very durable step which can be readily mounted in position by the vehicle owner.

Another object of the invention is to provide a safe and reliable step designed to be conveniently secured to the bumper of an automotive vehicle such as a truck, camper, or trailer to enable a ready ascent or descent to or from a vehicle.

Still another object of the invention is to provide a bumper step which is rugged in construction and easy to move to and from locked storage and use positions.

GENERAL DESCRIPTION OF THE DRAWINGS

The presently preferred embodiment of the invention is disclosed in the following description and in the accompanying drawings, wherein:

FIG. 2 is a front elevational view thereof;

FIG. 3 is an enlarged front elevational view of the step mount bracket only;

FIG. 4 is an end elevational view thereof;

FIG. 5 is an enlarged front elevational view of one of the step mount pins only;

FIG. 6 is an end elevational view thereof;

FIG. 7 is a side elevational view of the bumper mounting bolt only;

FIG. 8 is an end elevational view thereof; and

DETAILED DESCRIPTION

Figure 9:
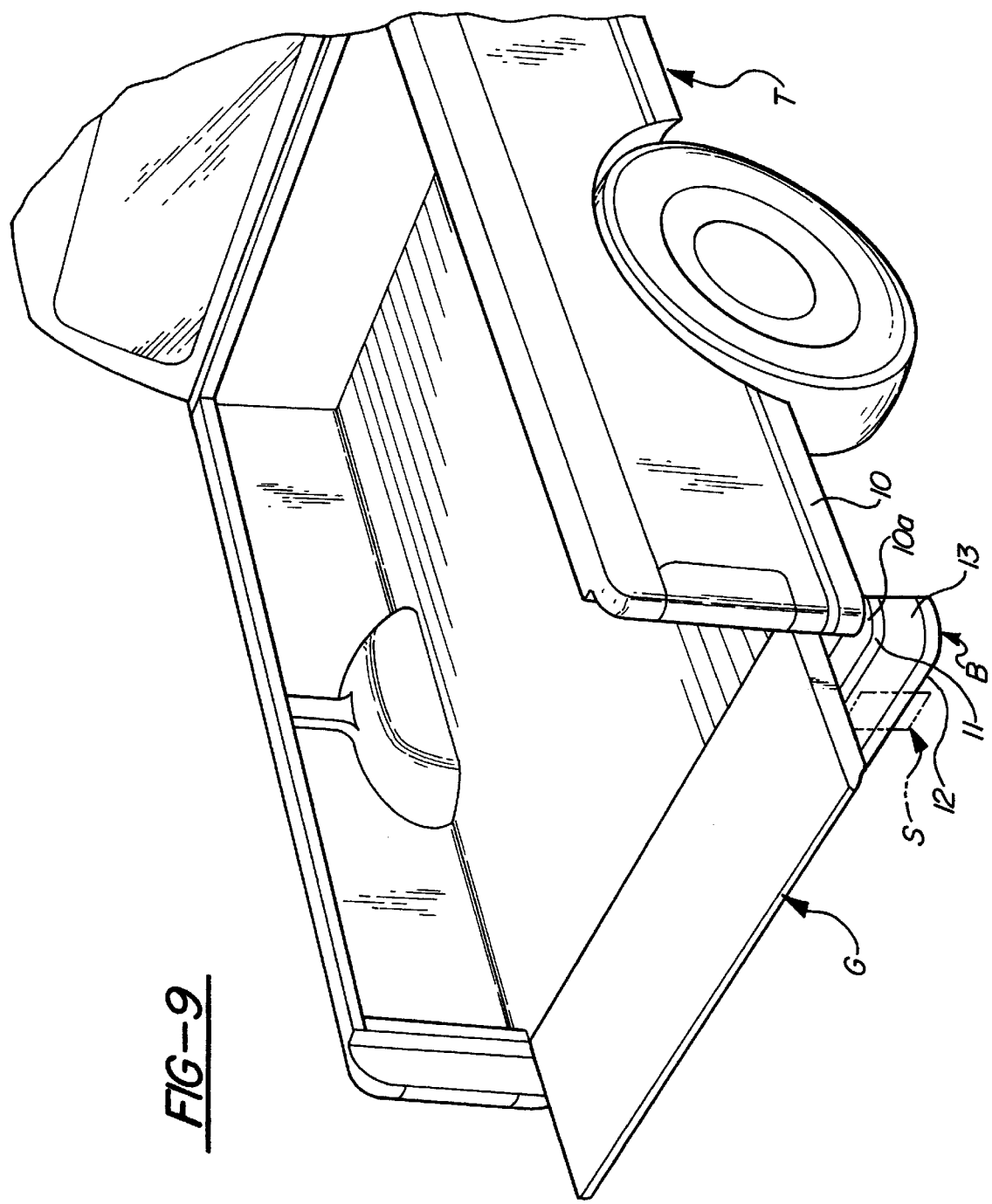
FIG. 9 is a side elevational view of a pick-up truck with its tailgate in lowered position, the chain lines indicating the general location of the step assembly.

Referring now particularly to the accompanying drawings, and in the first instance to FIGS. 1–2 and 9, the rear end of a pickup truck is generally shown at T as including a vehicle frame part 10 on which a rear bumper, generally designated B, is mounted in a rearwardly protruding position rearwardly of and below a pivotal tailgate assembly, generally designated G. While believed useful with other vehicles, the focus of the invention is to provide an accessing step to be used on the rear bumper of full size pickup trucks. The bumper B shown is one which has been used on 4×4's, of which many millions have been sold over the years and are in present use.

The present invention is particularly designed to be readily retrofitted to such vehicles whose bumpers include a generally flat upper surface 10 and a rear vertical surface configuration including upper and lower flat portions 11 and 12, respectively, bordering an inset flat surface 13. It is contemplated that a pair of the steps, generally designated S, are to be mounted on each rear bumper B, one adjacent each end of the bumper, as shown, particularly, in FIG. 2.

Each bumper step S comprises an angular member having an attachment leg 14 and a step portion or tread 15 provided with an angularly upwardly and rearwardly extending terminal edge 15a. Raised tread surfaces 15b are provided on the tread plate 15. The step S also includes a mount or mount bracket, generally designated M, positioned over a predrilled available opening 16 in the bumper face 13 which can be secured by a carriage bolt, generally designated 17, which extends through an opening boa in a frame brace 10b and is secured by a nut 17b. The carriage bolt 17 includes the usual square-shaped shank portion 17a, received within a square-shaped opening 18 provided through the mount plate 19 of the mount M, which has rearwardly extending bracket ears 20 at each end. It is to be noted that the rear face of the mount plate 19 is flat to correspond to the inset flat surface 13.

Welded as at 21, or otherwise appropriately fixed to the upper edge of the attachment leg 14 of the step S, are step pins 22, which as FIGS. 5 and 6 particularly illustrate, have flatted surfaces 22*a* provided on their outer ends. As FIG. 1 particularly indicates, the pins 22 extend through tracks or slots, generally designated 23, provided in the end members 20, as shown particularly in FIG. 4, and have enlarged circular restraining caps or ends 24 fixed at their outer ends. The enlarged caps or ends 24 may conveniently consist of washers welded to the ends of pins 22. There is an axial clearance provided between the caps 24 and the faces of the bracket ends 20 to permit a limited axial float of the step S with respect to the mount M.

Referring again to FIG. 4, it will be observed that the through slots 23 include enlarged, circular, upper portions 23*a* of a diameter to permit rotation of the flatted outer ends of pins 22 therein and reduced lower portions 23*b*, of a size only to slideably accommodate the flatted portions 22*a* of the pins 22, which extend at an forwardly and downwardly extending angle "x" to the vertical in the nature of 45 degrees and may be said to extend in a four to five o'clock range direction.

It is the flatted ends 22*a* of the pins 22, which are accommodated within the keyhole openings or tracks 23. The pins 22 cannot rotate within the portions 23*b* and can only slide generally vertically therein. When the flatted ends of the pins 22 reach the portions 23*a* of the openings 23, however, they are freely rotatable therein.

Provided in a predetermined location on the attachment leg 14 of the step S is an opening, generally designated 25, which is of a diameter to seat the neck portion 26*a* of a resilient elastomeric grommet or pad 26, which includes an enlarged diameter portion 27 and an enlarged diameter portion 28. The grommet 26, is formed with a through opening 29, to permit its ready deformation on installation. As FIG. 1 clearly shows, when the step S is in its first or operative position, the portion 28 of the grommet 26 is in engagement with the surface 12, and when the step S is swung up to its upper storage position, which may also be termed its second position, the wall 27 is in engagement with the surface 11.

The Operation

Figure 1:
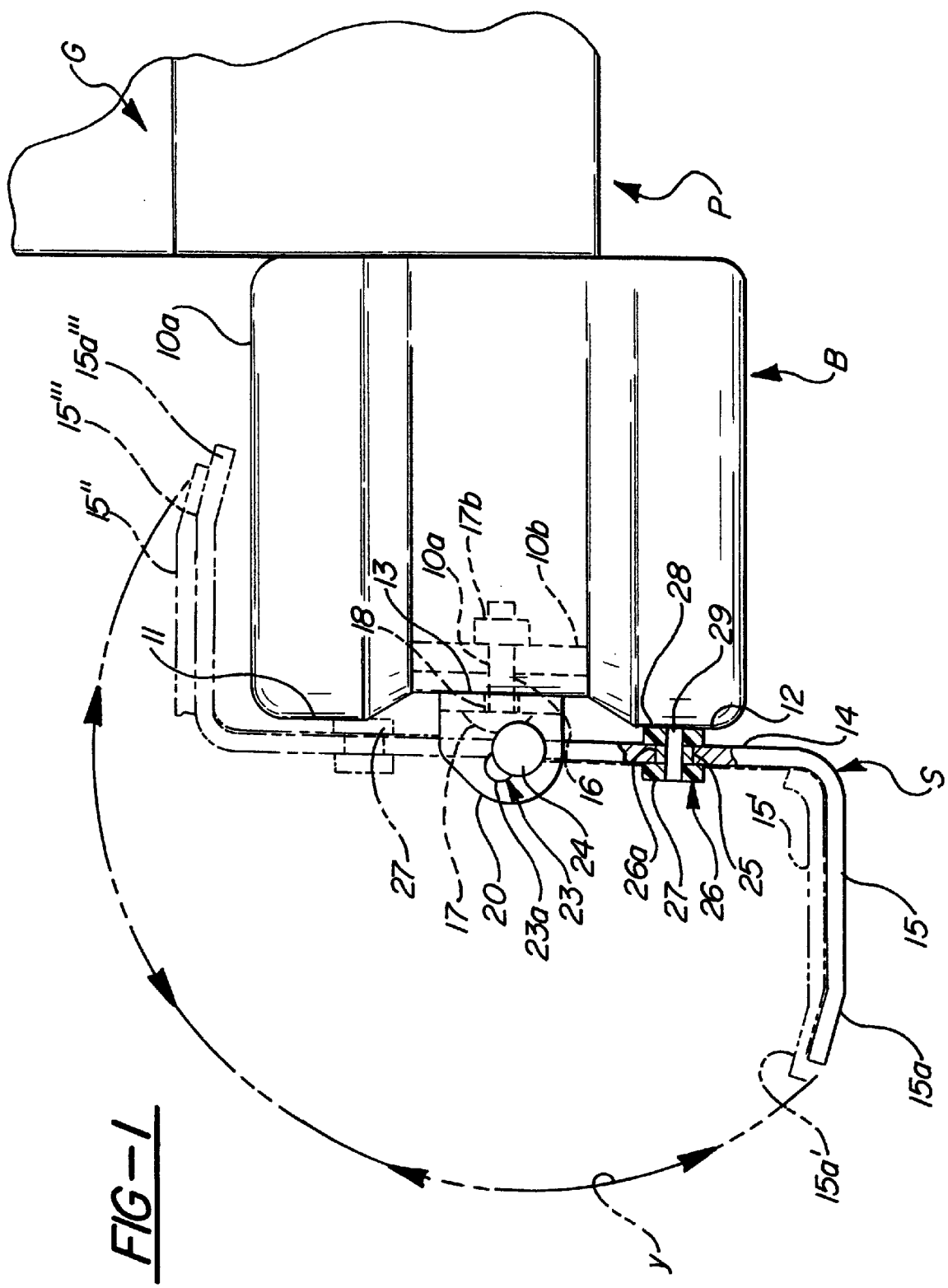
FIG. 1 is a schematic, partly sectional, side elevational view of the bumper step showing it mounted on a vehicle in its use position, certain chain lines indicating its locked storage position and other chain lines indicating an initially unlocked position of the bumper step at both positions.

With the step S in its operative first position, shown in solid lines in FIG. 1, adjacent an end of the bumper B, a user may raise a foot in sidewise disposition, extending transversely to the longitudinal extent of the vehicle, to the top of the tread portion 15, while at the same time grasping the side wall of the truck load bed to pull himself or herself, upwardly to a position to access the tailgate and truck bed. This can be accomplished with the tailgate in either swung down or vertically secured position. The inclination 15*a* of the step portion 15 tends to deflect the foot of the person forwardly toward the leg 14 to prevent the foot from tending to slip off the step portion 15 which it will be noted also has a tread surface.

In the use position, the step tends to drive or wedge itself into locked position when weight is applied to the step portion 15 as the flatted portions 22*a* of the pins 22 drive angularly in the inclined opening portions 23*b*. The general four to five o'clock angle of extent also tends to eliminate lateral tilting movement of the step surface if a load is unevenly applied to the step 15, as when the stepping pressure is applied initially on one side of the step or tread surface 15 in the act of mounting the step. The particular angularity of the portions 23*b* has further been shown to best prevent any jouncing or bouncing movement of the step S when the vehicle is being driven over bumpy roads or uneven terrain.

When, for example, loading or unloading of the vehicle is completed and the vehicle is to be driven away, the step S may be moved to storage position by initially sliding it upwardly in a generally vertical direction, (upward and rearward) until the flatted end portions 22*a* are situated in the portions 23*a* of the slots 23. In this position, the tread or step portion 15 will be in the 15' and 15*a*' position shown in FIG. 1 in chain lines, and the step 15 may be rotated in an arc "y" through substantially 180° to the 15"–15*a*" position shown in FIG. 1. When the step in the 15" position is released, gravity will move the flatted portions 22*a* of the pins downwardly in the slot portions 23*b* to wedge lock the step in its second or storage position which is indicated in chain lines at 15'". When use of the step S is again to be resumed, it is only necessary to lift the step portion in the storage position upwardly and rearwardly to remove the flatted portions 22*a* of pins 22 from the portions 23*b* of the slots 23 so that the step S can be swung down in the return arc "y" to position 15'–15*a*' and then permit gravity forces to move the pin ends 22*a* into slot portions 23*b* and the locked position.

Method of Construction

Normally, the bumper B is bolted to the frame brace 10*b* by a bolt extending through openings 16 and 10*a*. When this bolt is removed, the mount M will, first of all, be fixed in position by securing the carriage bolt 17 so as to provide the keyhole slots 23 with an upper enlarged portion 23*a* and a lower reduced size portion 23*b* in proper position. With the pins 22, with their cap ends 24, inserted through the openings 23, it is only necessary then to weld the pins 22 to the step leg 14 as indicated in FIG. 2.

Alternatively to the foregoing, various parts may be reversed. For instance the pins 22 may be fixed to the mount plate 13 and the slots 23 or tracks could be provided in ears fixed to the leg portion 14, although not with the same ease of manufacture.

The disclosed embodiment is representative of a presently preferred form of the invention, but is intended to be illustrative rather than definitive thereof. The invention is defined in the claims.

I claim:

1. In combination with a vehicle having a frame, a truck bed on the frame having a rear tailgate, and a rear bumper having an upper surface and a rearward generally vertical face, below said tailgate, and attached to the vehicle frame; an automatically locking step assembly comprising:
   a. a step having an attachment leg and a generally perpendicularly extending step portion of a width to receive a foot in general parallel disposition with said bumper;
   b. a mount supported on said bumper having a swinging connection with said step attachment leg and mounting said step for swinging movement from a first operative position in which said attachment leg is disposed generally vertically adjacent said bumper face and said step portion extends rearwardly to a retracted second position pivoted upwardly through an angle of substantially 180 degrees in which said attachment leg is vertically adjacent said bumper and said step portion is inversely disposed and extends in a forward direction along the upper surface of said bumper; and
   c. a lock device automatically operative between said mount and step under the influence of gravity for releasably locking said step in both said first and second positions when said step is released following its swinging to said positions.

2. The combination defined in claim 1 in which a resilient pad system mounts to and extends forwardly from said step attachment leg when the step is in said first position to engage the said face of said bumper to support the attachment leg in spaced position therefrom, and in said second step position engages the said face of said bumper to support the step portion in raised position above the upper surface of said bumper.

3. The combination defined in claim 1 wherein said mount comprises a plate having laterally spaced apart rearwardly extending brackets with aligned downwardly and forwardly inclined slots therein, said attachment leg having laterally projecting pins with flatted sections thereon extending through said slots to be captured therein, and functioning with said slots as said lock device; said slots having upper enlarged portions permitting rotation of said flatted sections of said pins and a lower reduced width portion permitting downward sliding motion of said flatted sections of said pins while restricting rotation of said flatted sections of said pins.

4. The combination defined in claim 3 wherein said slots are keyhole shaped and said lower portions thereof extend at a downward and forward angle generally in the four to five o'clock range to tend to wedge the pins against undesired movement.

5. The combination defined in claim 1 wherein said step portion has an angular terminal flange which extends upwardly angularly when the step is in said first position.

6. The combination defined in claim 1 wherein said bumper face has an opening near one end for attachment of the bumper to the vehicle frame and a fastener extending therethrough fixes said step to the bumper and said bumper to the frame.

7. The combination defined in claim 1 wherein said lock device comprises a connection between said attachment leg and mount wherein pivoting of said step on said mount is prohibited in said first and second positions but said leg can be slid vertically relative to said mount to a position in which pivoting of said step about said mount is permitted.

8. In a method of operating a bumper step assembly used on a vehicle having a frame supporting a bumper with a generally vertical face; said bumper step assembly including a step having an attachment leg and a generally perpendicularly extending step portion; a mount supported on said bumper face having a swinging connection with said attachment leg and mounting said step for swinging movement from a first operative, locked position in which said leg is disposed generally vertically adjacent said bumper face and said step portion extends generally horizontally to a second retracted locked position pivoted upwardly in which said step portion is inversely disposed; and a lock device comprising a connection between said mount and step attachment leg wherein pivoting of said step is permitted only when said leg is generally linearly raised from said first and second positions but is prohibited from pivoting unless said leg is so raised, the steps of:

a. sliding said attachment leg upwardly relative to said mount from said first position to a raised position in which said leg can pivot;

b. swinging said leg upwardly through substantially a 180 degree arc to invert said step portion; and c. permitting said upwardly swung leg to slide downwardly to locked position.

9. The method of claim 8 including the further steps of:

d. sliding said attachment leg upwardly relative to said mount from said second position;

e. swinging said leg downwardly toward said first position; and f. permitting said leg to slide downwardly to locked position.

10. A step device for a vehicle having a frame and a rear bumper, with an upper surface and a generally vertical outer face attached to the vehicle frame comprising;

a. a step having an attachment leg with opposite sides and a generally perpendicularly extending step portion of a width to receive a foot in generally parallel disposition with said bumper;

b. a mount bracket to be supported on said bumper having a swinging connection with said step attachment leg and mounting said step for swinging movement from a first operative position in which one side of said attachment leg is disposed generally vertically adjacent said bumper face and said step portion extends generally perpendicularly to a retracted second position pivoted upwardly through an angle to dispose the opposite side of said attachment leg generally vertically adjacent said bumper in a position in which said step portion is generally inversely disposed to extend above the upper surface of said bumper; and c. a lock device automatically operative between said mount and step under the influence of gravity for releasably locking said step in both said first and second positions when said step is released following its swinging to said positions.

11. The combination defined in claim 10 in which a resilient member mounts to and extends from both sides of said step attachment leg to engage the said face of said bumper when the step is in either of its positions.

12. The combination defined in claim 10 wherein said mount comprises a plate having laterally spaced apart generally perpendicularly extending brackets with aligned vertically inclined slots inclined downwardly in a direction toward said plate, said attachment leg having laterally projecting pins with reduced sections thereon extending through said slots to be captured therein, and functioning with said slots as said lock device; said slots having upper enlarged portions permitting rotation of said reduced sections and lower reduced portions permitting downward sliding motion of said reduced sections of said pins while restricting rotation of said reduced sections of said pins.

13. The combination defined in claim 12 wherein said reduced portions of said slots extend at a downward angle generally in the four to five o'clock direction.

14. The combination defined in claim 10 wherein said step portion has an angular terminal flange which extends upwardly angularly when the step is in said first position.

15. The invention defined in claim 10 wherein said lock device comprises a connection between said attachment leg and mount functioning to support said step on said mount and wherein pivoting of said step on said mount is prohibited in said first and second positions but sliding movement of said leg upwardly relative to said mount is permitted to a position in which said connection permits pivoting of said step about said mount.

16. In a method of making a bumper step assembly used on a vehicle having a frame supporting a bumper with a generally vertical face; said bumper step assembly including a step having an attachment leg and a generally perpendicularly extending step portion; a mount adapted to be supported on said bumper face and having a swinging connection with said attachment leg for mounting said step for swinging movement from a first operative, locked position in which said leg is disposed generally vertically adjacent said bumper face and said step portion extends generally horizontally to a second retracted locked position pivoted upwardly in which said step portion is inversely disposed; and a lock device comprising a step supporting connection between said mount and step attachment leg comprising configured tracks in said mount; the steps of:

a. providing said mounts in conjunction with pins with ends configured and sized to coact with said tracks so that pivoting of said pins is permitted only when said leg is generally linearly raised from either of said first and second positions but is prohibited from pivoting unless said leg is so raised;

b. inserting said pin ends into said slots and fixing said pins to said step portion; and c. permitting said pin ends to descend in said tracks.

17. The method of claim 16 comprising forming said mount slots with enlarged upper ends in which said pin ends can freely rotate and reduced width lower portions comprising slot portions extending at a downwardly inclined angle in which said pin ends can slide but not rotate.

* * * * *